United States Patent
Akatsuka et al.

(10) Patent No.: US 12,008,685 B2
(45) Date of Patent: Jun. 11, 2024

(54) VEHICULAR DISPLAY DEVICE, VEHICULAR DISPLAY SYSTEM, VEHICULAR DISPLAY METHOD, AND NON-TRANSITORY STORAGE MEDIUM STORED WITH PROGRAM

(71) Applicant: TOYOTA JIDOSHA KABUSHIKI KAISHA, Toyota (JP)

(72) Inventors: Kosuke Akatsuka, Mishima (JP); Shuichi Tamagawa, Kitanagoya (JP); Yuki Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 17/875,571

(22) Filed: Jul. 28, 2022

(65) Prior Publication Data

US 2023/0082603 A1    Mar. 16, 2023

(30) Foreign Application Priority Data

Sep. 16, 2021    (JP) .................................. 2021-151228

(51) Int. Cl.
| | | |
|---|---|---|
| *G06T 11/00* | (2006.01) | |
| *B60K 35/00* | (2006.01) | |
| B60K 35/23 | (2024.01) | |
| B60K 35/29 | (2024.01) | |

(52) U.S. Cl.
CPC ............ *G06T 11/001* (2013.01); *B60K 35/00* (2013.01); *B60K 35/23* (2024.01); *B60K 35/29* (2024.01); *B60K 2360/188* (2024.01); *B60K 2360/191* (2024.01)

(58) Field of Classification Search
CPC ........ B60K 2370/191; B60K 2370/188; B60K 2370/177; B60K 35/00; B60K 2370/1529; G06T 11/001
See application file for complete search history.

(56) References Cited

U.S. PATENT DOCUMENTS

| | | | | |
|---|---|---|---|---|
| 5,051,735 | A | * | 9/1991 | Furukawa ............... G02B 27/01 701/1 |
| 2012/0316779 | A1 | | 12/2012 | Kanno et al. |
| 2013/0307985 | A1 | * | 11/2013 | Numata .................... H04N 7/18 348/148 |
| 2015/0062341 | A1 | * | 3/2015 | Nakata .................. G06T 11/001 348/148 |
| 2016/0225261 | A1 | * | 8/2016 | Matsumoto ......... B60W 10/184 |
| 2018/0244153 | A1 | * | 8/2018 | Ejiri ........................ B60R 1/002 |
| 2019/0011911 | A1 | | 1/2019 | Kubo et al. |
| 2021/0347378 | A1 | * | 11/2021 | Nabatchian ............ G06V 20/56 |

FOREIGN PATENT DOCUMENTS

| | | |
|---|---|---|
| JP | H08-178679 A | 7/1996 |
| JP | 2013-091331 A | 5/2013 |
| JP | 2016-085483 A | 5/2016 |
| JP | 2019-016188 A | 1/2019 |

* cited by examiner

*Primary Examiner* — Phi Hoang
(74) *Attorney, Agent, or Firm* — Oliff PLC (57) ABSTRACT

A vehicular display device includes: a processor, wherein the processor is configured to: acquire vehicle speed information regarding a vehicle; and display a line image extending toward a vehicle front side and having a base end in a vicinity of the vehicle by displaying the line image in a predetermined display region so as to appear in front of the vehicle, and perform emphasized display further toward a leading end side of the line image as the vehicle speed increases.

12 Claims, 12 Drawing Sheets

VEHICULAR DISPLAY DEVICE, VEHICULAR DISPLAY SYSTEM, VEHICULAR DISPLAY METHOD, AND NON-TRANSITORY STORAGE MEDIUM STORED WITH PROGRAM

CROSS-REFERENCE TO RELATED APPLICATION

This application is based on and claims priority under 35 USC 119 from Japanese Patent Application No. 2021-151228 filed on Sep. 16, 2021, the disclosure of which is incorporated by reference herein.

BACKGROUND

Technical Field

The present disclosure relates to a vehicular display device, a vehicular display system, a vehicular display method, and a non-transitory storage medium stored with a program.

Related Art

Japanese Patent Application Laid-Open (JP-A) No. H08-178679 discloses an onboard display device in which a predicted travel trajectory of a vehicle is displayed on a Head-Up Display. In the onboard display device disclosed in JP-A No. H08-178679, the display color of the predicted travel trajectory differs according to a travel speed and acceleration of the vehicle.

Displaying a line image in front of the vehicle as in the device disclosed in JP-A No. H08-178679 enables the gaze of an occupant to be directed in front of the vehicle. However, it would be preferable to move the gaze of a driver driving the vehicle according to the vehicle speed, such that their gaze is directed further forward as the vehicle speed increases and their gaze is directed toward a position closer to their vehicle as the vehicle speed decreases, since this would lead to more stable travel.

SUMMARY

The present disclosure provides a vehicular display device, a vehicular display system, a vehicular display method, and a non-transitory storage medium stored with a program that enable a gaze of a driver to be guided in a suitable direction according to a travel speed of a vehicle in configurations that display an image of in front of the vehicle.

A first aspect of the present disclosure is a vehicular display device including: a processor, wherein the processor is configured to: acquire vehicle speed information regarding a vehicle; and display a line image extending toward a vehicle front side and having a base end in a vicinity of the vehicle by displaying the line image in a predetermined display region so as to appear in front of the vehicle, and perform emphasized display further toward a leading end side of the line image as the vehicle speed increases.

In the vehicular display device of the first aspect, the line image that extends toward the vehicle front side from the vicinity of the vehicle is displayed so as to appear in front of the vehicle. Emphasized display is performed further toward the leading end side of the line image as the vehicle speed increases. Thus, emphasized display of the vehicle side of the line image is performed in cases in which the vehicle speed is slow. Thus, when the line image is displayed so as to appear in front of the vehicle, the gaze of a driver viewing the line image can be guided further toward the leading end side of the line image for which emphasized display is being performed as the vehicle speed increases. Note that here, "extending toward a vehicle front side" is a broad concept that is not limited to configurations extending in front of the vehicle in a straight line from the vicinity of the vehicle, and includes configurations extending toward the vehicle front side while curving.

In a second aspect of the present disclosure, in the first aspect, the processor may be configured to: acquire image information regarding a captured image of in front of the vehicle; and display the line image superimposed on the image of in front of the vehicle.

In the vehicular display device of the second aspect, since the line image is displayed superimposed on the image of in front of the vehicle, the gaze of the driver viewing the image can be directed toward a suitable position according to the vehicle speed.

In a third aspect of the present disclosure, in the first aspect, the processor may be configured to display the line image superimposed on a scene ahead of the vehicle as seen by an occupant, by projecting the line image onto a windshield glass.

In the vehicular display device of the third aspect, since the occupant views the line image displayed superimposed on the scene ahead, the gaze of the occupant can be directed toward a suitable position according to the vehicle speed.

In a fourth aspect of the present disclosure, in the first aspect, the processor may be configured to perform display such that a length of the line image becomes longer as the vehicle speed increases.

In the vehicular display device of the fourth aspect, the length of the line image becomes longer, and emphasized display is performed further toward the leading end side of the line image, as the vehicle speed increases. The gaze of the driver is even more easily guided as a result.

In a fifth aspect of the present disclosure, in the fourth aspect, the processor may be configured to: display a pair of line images at positions corresponding to both width direction ends of the vehicle; and cause the line images to curve along a trajectory corresponding to a steering angle of the vehicle.

In the vehicular display device of the fifth aspect, the pair of line images are displayed at positions corresponding to both width direction ends of the vehicle, thereby enabling the driver to indirectly ascertain the width of the vehicle simply by viewing the width between the line images. Moreover, since the line images curve corresponding to the steering angle of the vehicle, the line images can be utilized as predicted trajectory lines of the vehicle.

In a sixth aspect of the present disclosure, in the first aspect, the processor may be configured to perform emphasized display such that the line image becomes a darker shade further toward the leading end side as the vehicle speed increases.

In the vehicular display device of the sixth aspect, the darker area shifts toward the leading end side when the vehicle speed increases. Since the gaze is generally drawn to darker colors than to lighter colors, the gaze of the driver can be guided in a suitable direction by this visual effect.

In a seventh aspect of the present disclosure, in the first aspect, the processor may be configured to display the line image in a color indicating greater emphasis further toward the leading end side than a base end side as the vehicle speed increases.

In the vehicular display device of the seventh aspect, an area of the line image depicted in the emphatic color shifts toward the leading end when the vehicle speed increases. Since the gaze is generally drawn to emphatic colors, the gaze of the driver may be guided in a suitable direction by this visual effect. Note that here, "emphatic color" is not just limited to colors with a high color saturation, and may be a color that contrasts the color of another area.

In a eighth aspect of the present disclosure, in the first aspect, the processor may be configured to perform emphasized display such that the line image becomes thicker further toward the leading end side as the vehicle speed increases.

In the vehicular display device of the eighth aspect, the thicker area of the line image shifts toward the leading end side when the vehicle speed increases. Since the gaze of the driver is generally drawn to thicker areas than to thinner areas, the gaze of the driver can be guided in a suitable direction by this visual effect.

In a ninth aspect of the present disclosure, in the first aspect, the processor may be configured to display the line image as transparent or in a light color that is barely visible.

The vehicular display device of the ninth aspect enables an area depicted in an emphatic color to be displayed so as to appear to move away from the vehicle from the perspective of the driver.

In a tenth aspect of the present disclosure is a vehicular display system including: the vehicular display device of any one of claim 1 to claim 9; and a display provided inside a vehicle cabin or outside the vehicle cabin and configured to display an image of in front of the vehicle and the line image.

In the vehicular display system of the tenth aspect, the line image is displayed on the display. Thus, for example, in cases in which the vehicle is being remotely operated from outside the vehicle, the driver can direct their gaze toward a suitable position according to the vehicle speed by viewing the line image displayed on the display, even if they are not onboard the vehicle.

In a eleventh aspect of the present disclosure is a vehicular display method including: acquiring vehicle speed information regarding a vehicle; and displaying a straight line-shaped mark extending in a direction of progress in front of the vehicle from a vehicle side in a predetermined display region, and performing emphasized display further toward a leading end side of the mark as the vehicle speed increases.

In a twelfth aspect of the present disclosure is a non-transitory storage medium stored with a program executable by a computer such that the computer executes processing including: acquiring vehicle speed information regarding a vehicle, displaying a line image extending toward a vehicle front side and having a base end in a vicinity of the vehicle by displaying the line image in a predetermined display region so as to appear in front of the vehicle, and performing emphasized display further toward a leading end side of the line image as the vehicle speed increases.

As described above, the vehicular display device, the vehicular display system, the vehicular display method, and the non-transitory storage medium stored with a program according to the present disclosure enable the gaze of the driver to be guided in a suitable direction according to the travel speed of the vehicle in configurations that display an image of in front of the vehicle.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicular display system 10 according to a first exemplary embodiment, with reference to the drawings. Note that the dimensional proportions in the drawings may be exaggerated to aid explanation, and may therefore differ from actual proportions.

Figure 1:
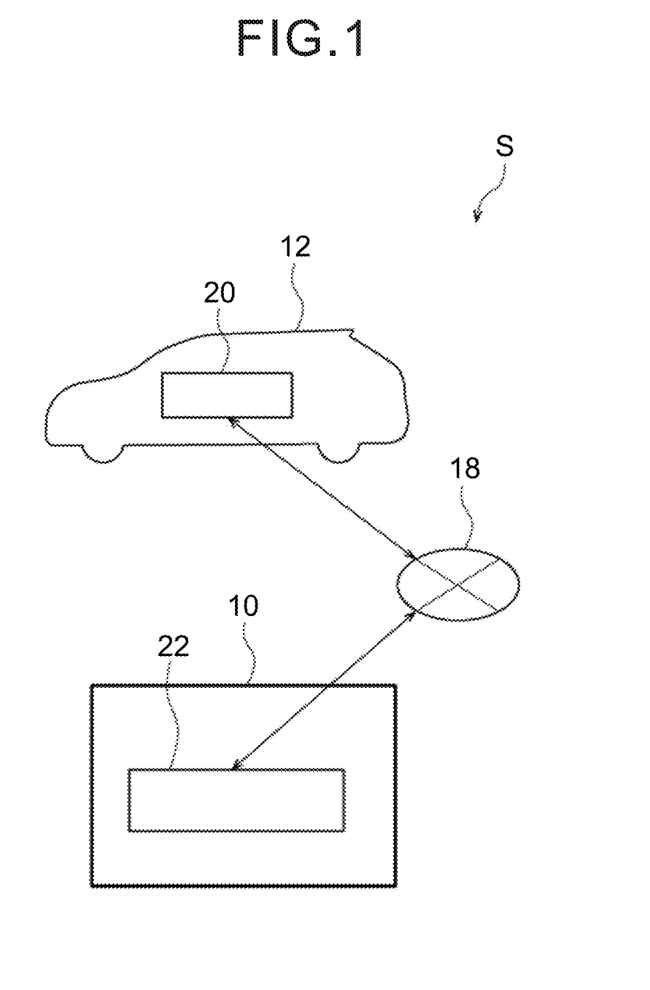
FIG. 1 is a diagram illustrating a schematic configuration of a remote operating system including a vehicular display system according to a first exemplary embodiment.

As illustrated in FIG. 1, a remote operating system S is configured including a vehicle 12 and the vehicular display system 10. The vehicle 12 and the vehicular display system 10 are connected over a predetermined network 18.

The vehicle 12 of the present exemplary embodiment includes a travel control section 20. The vehicle 12 is configured so as to be capable of switching between a manual driving mode and a remote operating mode (remote driving mode). In the manual driving mode, an occupant (driver) of the vehicle 12 performs operations to cause the vehicle 12 to travel. In the remote operating mode, the travel control section 20 causes the vehicle 12 to travel based on remote operating signals input from the vehicular display system 10. Namely, the vehicular display system 10 of the present exemplary embodiment is employed as a remote operating device.

The vehicular display system 10 includes a display 64 (see FIG. 3) that displays images and is provided externally to the vehicle 12 (externally to the vehicle cabin). Predetermined images including a scene ahead of the vehicle 12 are displayed on the display 64. The vehicular display system 10 also includes a vehicular display device 22 for performing display processing for the display 64. The vehicular display device 22 includes a remote operating function, and is configured to transmit remote operating signals input by an operator to the vehicle 12 over the network 18. Note that the operator (driver) performing remote operation drives the vehicle 12 by remote operation while viewing the images displayed on the display 64.

Hardware Configuration of Vehicle 12

Figure 2:
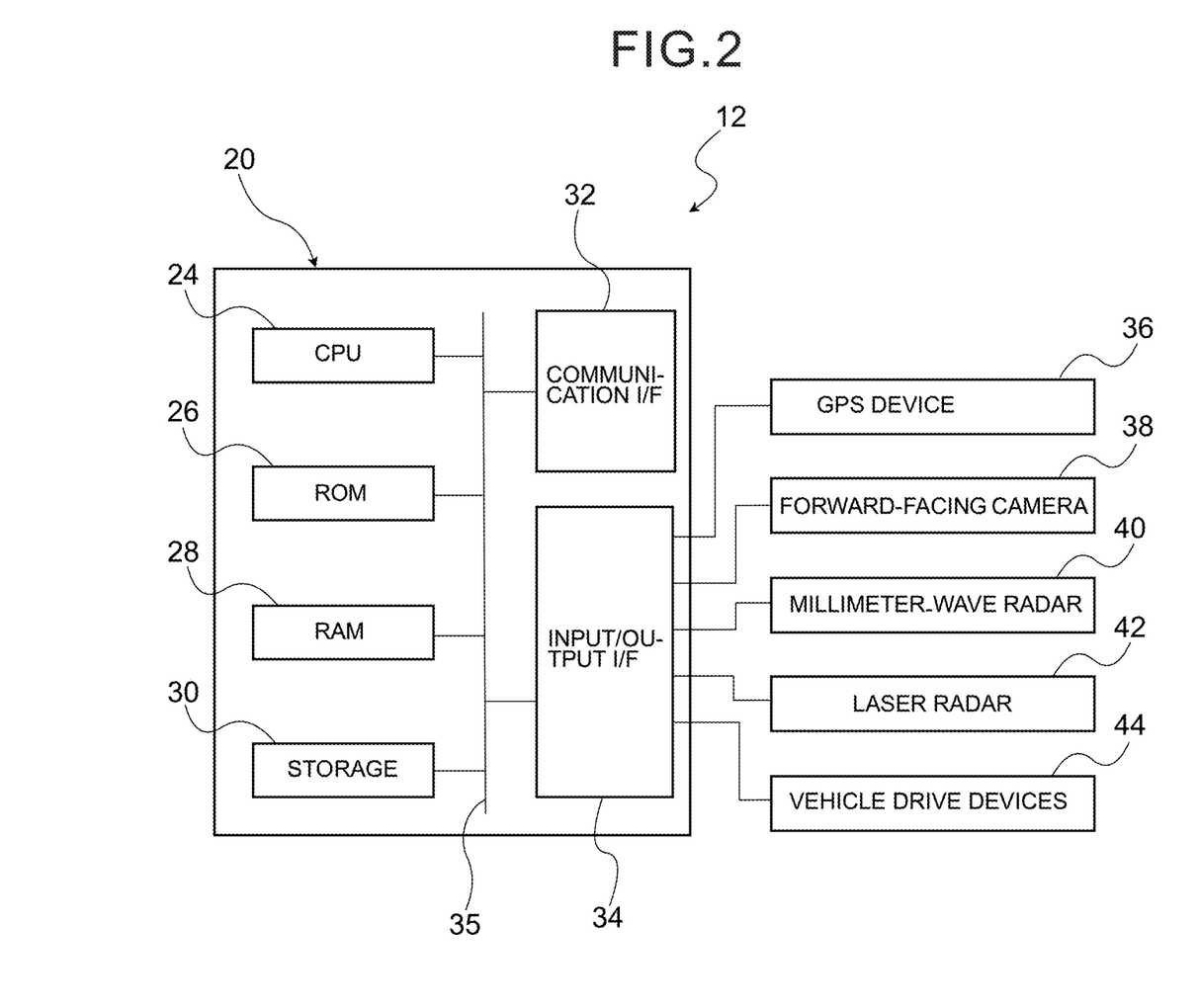
FIG. 2 is a block diagram illustrating a hardware configuration of a vehicle.

FIG. 2 is a block diagram illustrating a hardware configuration of the vehicle 12. As illustrated in FIG. 2, the travel control section 20 of the vehicle 12 is configured including a central processing unit (CPU; processor) 24, read only memory (ROM) 26, random access memory (RAM) 28, storage 30, a communication interface (communication I/F) 32, and an input/output interface (input/output I/F) 34. The respective configuration elements are connected so as to be capable of communicating with one another through an internal bus 35.

The CPU 24 is a central processing unit that executes various programs and controls respective sections. Namely, the CPU 24 read programs from the ROM 26 or the storage 30, and executes the programs using the RAM 28 as a workspace. The CPU 24 also controls the respective configuration elements and performs various arithmetic processing according to the programs recorded in the ROM 26 or the storage 30.

The ROM 26 holds various programs and various data. The RAM 28 acts as a workspace to temporarily store programs or data. The storage 30 is configured by a hard disk drive (HDD) or a solid state drive (SSD), and is a non-transitory storage medium that holds various programs including an operating system, and various data.

The communication interface 32 is an interface enabling the vehicle 12 to communicate with the vehicular display device 22, an external server, other equipment, and so on, and a standard such as a Controller Area Network (CAN), Ethernet (registered trademark), Long Term Evolution (LTE), Fiber Distributed Data Interface (FDDI), or Wi-Fi (registered trademark) may be employed therefor.

A Global Positioning System (GPS) device 36, a forward-facing camera 38, a millimeter-wave radar 40, a laser radar 42, and vehicle drive devices 44 are connected to the input/output interface 34. The GPS device 36 receives GPS signals from plural GPS satellites to locate the position of the ego vehicle. The greater the number of GPS signals that can be received, the greater the positioning precision by the GPS device 36.

Figure 5:
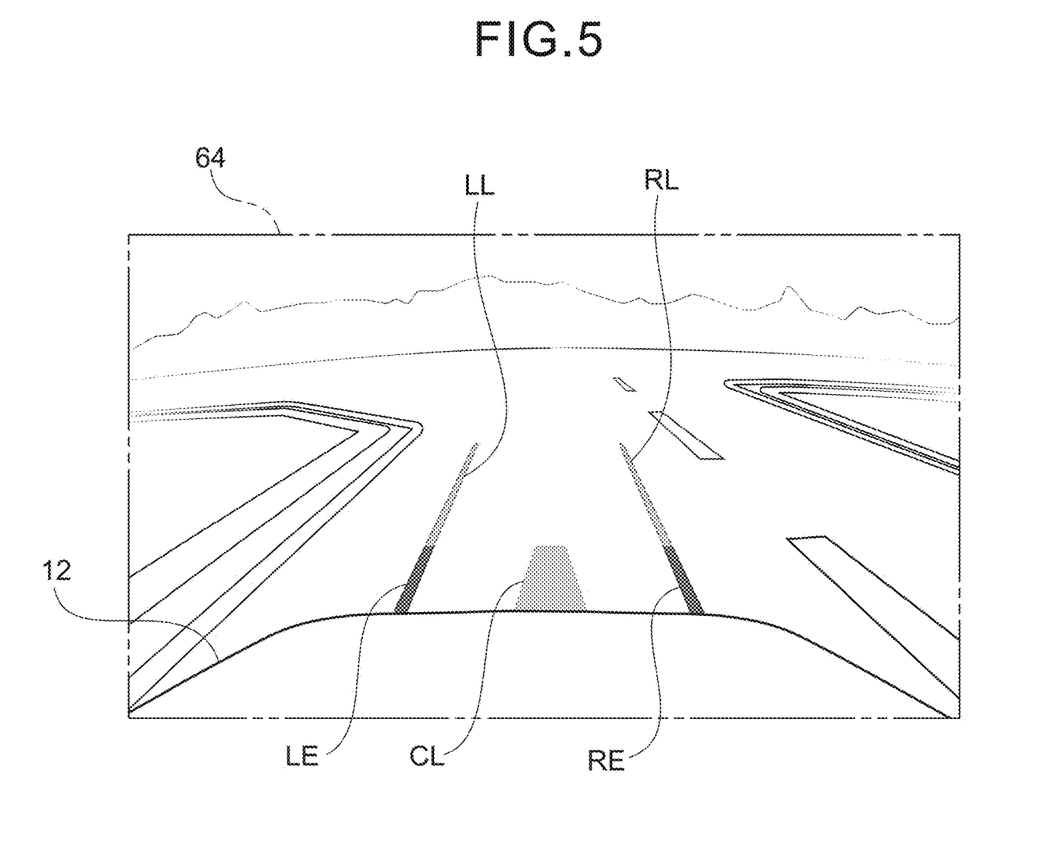
FIG. 5 is a diagram illustrating a display example on a display in a state in which a travel speed is low.

The forward-facing camera 38 is installed to a front section of the vehicle 12 so as to image in front of the vehicle. As an example, the forward-facing camera 38 of the present exemplary embodiment is configured to image a scene ahead including a front end section of the vehicle 12, as illustrated in FIG. 5.

The millimeter-wave radar 40 emits radio waves and measures the reflected waves to detect obstacles in the surroundings of the vehicle 12. The laser radar 42 pulses laser light and measures the reflected light to detect obstacles in the surroundings of the vehicle 12.

The vehicle drive devices 44 cause the vehicle 12 to drive based on signals input by the occupant or the operator. Namely, the vehicle drive devices 44 include a steering wheel actuator, an accelerator pedal actuator, and a brake actuator.

Hardware Configuration of Vehicular Display System 10

Figure 3:
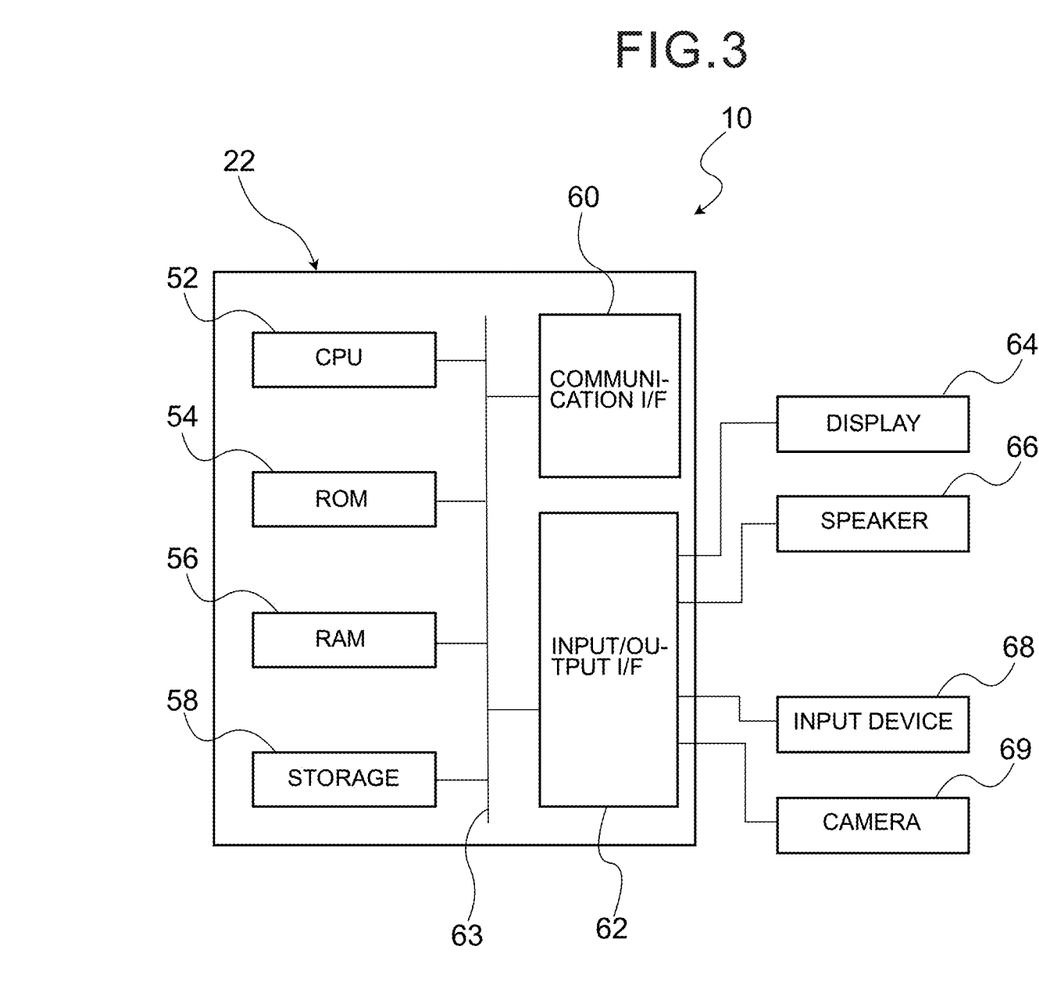
FIG. 3 is a block diagram illustrating a hardware configuration of a vehicular display system according to the first exemplary embodiment.

FIG. 3 is a block diagram illustrating a hardware configuration of the vehicular display system 10. As illustrated in FIG. 3, the vehicular display system 10 includes the vehicular display device 22. The vehicular display device 22 is configured including a central processing unit (CPU; processor) 52, read only memory (ROM) 54, random access memory (RAM) 56, storage 58, a communication interface (communication I/F) 60, and an input/output interface (input/output I/F) 62. The respective configuration elements are connected so as to be capable of communicating with one another through an internal bus 63.

The CPU 52 is a central processing unit that executes various programs and controls respective sections. Namely, the CPU 52 read programs from the ROM 54 or the storage 58, and executes the programs using the RAM 56 as a workspace. The CPU 52 also controls the respective configuration elements and performs various arithmetic processing according to the programs recorded in the ROM 54 or the storage 58.

The ROM 54 holds various programs and various data. The RAM 56 acts as a workspace to temporarily store programs or data. The storage 58 is configured by a hard disk drive (HDD) or a solid state drive (SSD), and holds various programs including an operating system, and various data.

The communication interface 60 is an interface enabling the vehicular display device 22 to communicate with the vehicle 12 and other equipment, and a standard such as Ethernet (registered trademark), FDDI, or Wi-Fi (registered trademark) may be employed therefor.

The display 64, a speaker 66, an input device 68, and a camera 69 are electrically connected to the input/output interface 62. A picture of the surroundings of the vehicle 12 and information regarding various instruments in the vehicle 12 are displayed to the operator on the display 64. Note that plural displays 64 may be provided.

The speaker 66 is a device for outputting audio to the operator, and is for example employed in order to interact with the occupant of the vehicle 12. The input device 68 is a device enabling the operator to input remote operating signals to the vehicular display device 22. For example, an input device representing a cockpit of the vehicle 12 may be employed as the input device 68. In such cases, the operator is able to perform remote operation experiencing similar sensations as when driving the actual vehicle.

As another example, a controller that is provided with plural buttons and can be gripped by the operator may be employed as an input device. Such a controller may take the form of a controller employed when playing a computer game. In such cases, an operator who unable to use their legs is able to remotely operate the vehicle 12.

The camera 69 is installed so as to face toward the operator and to image the operator. Specifically, the camera 69 is configured to image the face of the operator.

Functional Configuration of Vehicular Display Device 22

The vehicular display device 22 implements various functions using the above-described hardware resources. Explanation follows regarding functional configuration implemented by the vehicular display device 22, with reference to FIG. 4.

Figure 4:
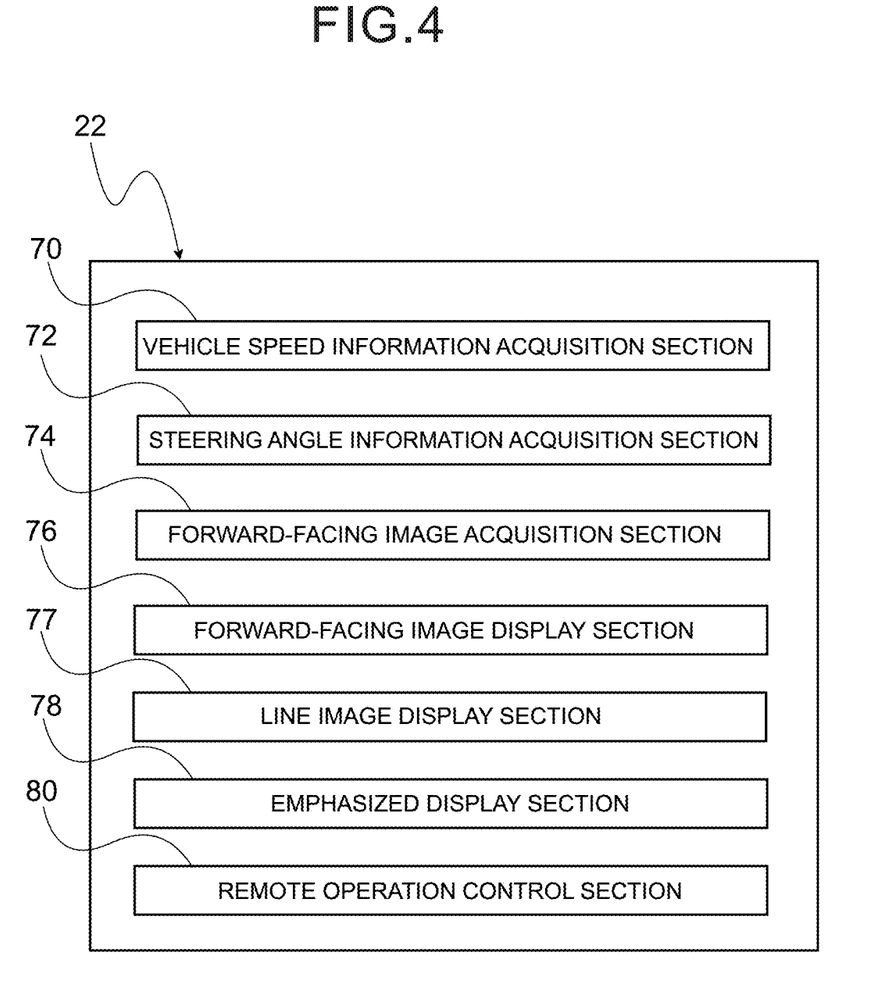
FIG. 4 is a block diagram illustrating a functional configuration of a vehicular display device according to the first exemplary embodiment.

As illustrated in FIG. 4, the vehicular display device 22 is configured including as functional configuration a vehicle speed information acquisition section 70, a steering angle information acquisition section 72, a forward-facing image acquisition section 74, a forward-facing image display section 76, a line image display section 77, an emphasized display section 78, and a remote operation control section 80. The respective functional configuration is implemented by the CPU 52 reading and executing a program stored in the ROM 54 or the storage 58.

The vehicle speed information acquisition section 70 acquires vehicle speed information regarding the vehicle 12. Specifically, the vehicle speed information acquisition section 70 acquires information relating to the vehicle speed detected by a non-illustrated vehicle speed sensor installed in the vehicle 12.

The steering angle information acquisition section 72 acquires steering angle information regarding the vehicle 12. Specifically, the steering angle information acquisition section 72 acquires information relating to the steering angle detected by a non-illustrated steering angle sensor installed in the vehicle 12.

The forward-facing image acquisition section 74 acquires image information regarding a captured image of in front of the vehicle 12. Specifically, the forward-facing image acquisition section 74 acquires image information for in front of the vehicle 12 as captured by the forward-facing camera 38 installed in the vehicle 12.

The forward-facing image display section 76 displays the captured image of in front of the vehicle 12 on the display 64. Specifically, the forward-facing image display section 76 displays the image of in front of the vehicle 12 acquired by the forward-facing image acquisition section 74 on the display 64.

The line image display section 77 displays a line image extending toward a vehicle front side and having a base end in a vicinity of the vehicle by displaying the line image in a predetermined display region so as to appear in front of the vehicle 12. In the present exemplary embodiment, the line image display section 77 displays the line image superimposed in front of the vehicle 12 in the vehicle forward-facing image displayed on the display 64. The emphasized display section 78 performs emphasized display further toward a leading end side of the line image as the vehicle speed increases. Explanation follows regarding the functionality of the line image display section 77 and the emphasized display section 78, with reference to display examples illustrated in FIG. 5 and FIG. 6.

FIG. 5 illustrates a display example of an image of in front of the vehicle 12 displayed on the display 64. As illustrated in FIG. 5, the front end section of the vehicle 12 is displayed at a lower section of the display 64. A line image RL and a line image LL are displayed extending forward from the front end section of the vehicle 12.

The line image RL corresponds to a position of a front right wheel of the vehicle 12 so as to visually display a right end of the vehicle 12. The line image LL corresponds to a position of a front left wheel of the vehicle 12 so as to visually display a left end of the vehicle 12.

The line image display section 77 of the present exemplary embodiment is configured so as to also display a line image CL between the line image RL on the right side and the line image LL on the left side. The line image CL corresponds to a width direction center of the vehicle 12.

Note that a dark-shaded area RE where emphasized display is performed by the emphasized display section 78 is displayed at a base end side of the right line image RL (in the vicinity of the vehicle 12). Similarly, a dark-shaded area LE where emphasized display is performed by the emphasized display section 78 is displayed at a base end side of the left line image LL (in the vicinity of the vehicle 12).

The dark-shaded area RE is displayed in a darker shade than other areas of the line image RL, and the dark-shaded area LE is displayed in a darker shade than other areas of the line image LL.

Figure 6:
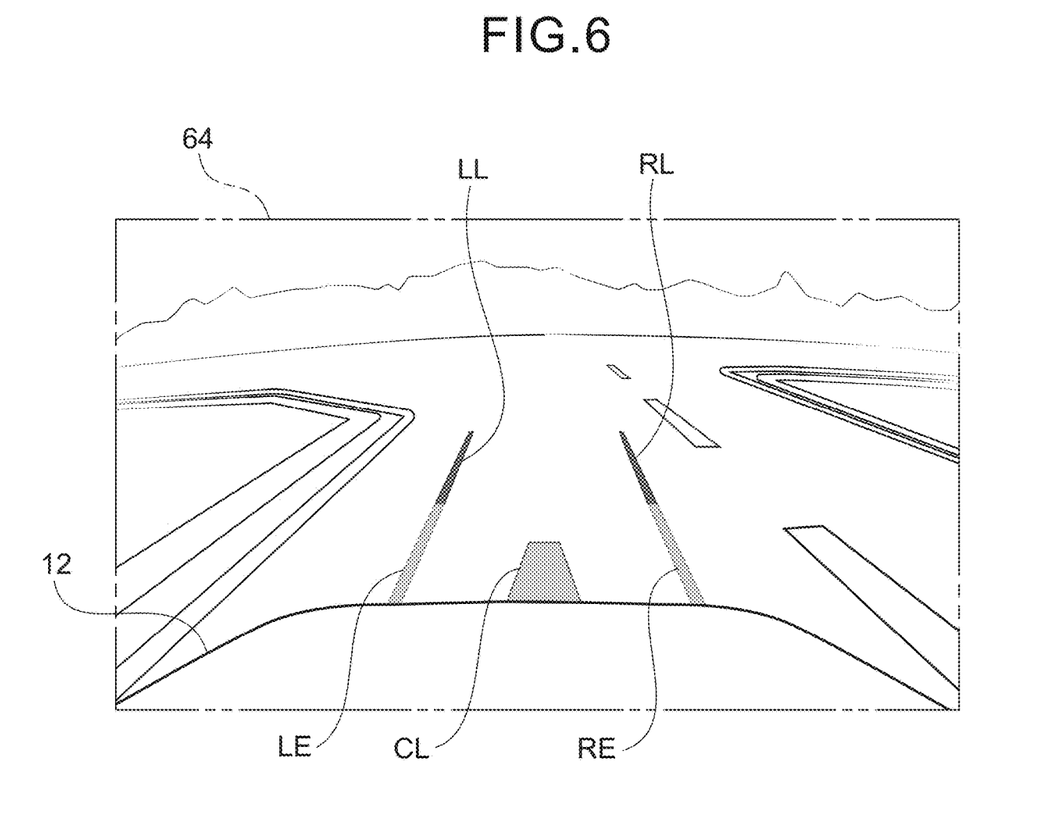
FIG. 6 is a diagram illustrating a display example on a display in a state in which a travel speed is high.

FIG. 6 illustrates a display example of an image of in front of the vehicle 12 displayed on the display 64 in a state in which the travel speed of the vehicle 12 is faster than in FIG. 5. As illustrated in FIG. 6, in the state in which the travel speed of the vehicle 12 has increased, the emphasized display section 78 has shifted the dark-shaded area RE further toward a leading end side of the line image RL, and shifted the dark-shaded area LE further toward a leading end side of the line image LL. Specifically, the emphasized display section 78 displays the dark-shaded area RE on the line image RL based on display coordinates for the dark-shaded area RE that have been preset according to the speed of the vehicle 12. Similarly, the emphasized display section 78 displays the dark-shaded area LE on the line image LL based on display coordinates for the dark-shaded area LE that have been preset according to the speed of the vehicle 12. In this manner, in the present exemplary embodiment, emphasized display is performed by the emphasized display section 78 such that the line images RL, LL become a darker shade further toward their leading end sides as the travel speed of the vehicle 12 increases.

Note that the emphasized display section 78 may either shift the dark-shaded areas RE, LE intermittently, or shift the dark-shaded areas RE, LE continuously according to changes in the vehicle speed. For example, in cases in which the dark-shaded areas RE, LE are shifted intermittently, the line images RL, LL may each be divided into plural regions between their leading ends and their base ends, and vehicle speed ranges may be set corresponding to these respective regions.

As illustrated in FIG. 4, the remote operation control section 80 has a function to control remote operation of the vehicle 12. Specifically, the remote operation control section 80 includes a function of detecting surroundings information regarding the vehicle 12 based on information acquired from various sensors, such as the millimeter-wave radar 40 and the laser radar 42.

In cases in which remote operation by the vehicular display device 22 that is a vehicle external section has been permitted due to predetermined conditions being satisfied, the remote operation control section 80 causes the vehicle 12 to travel based on received remote operating signals. Namely, the vehicular display device 22 causes the vehicle 12 to travel by controlling the vehicle drive devices 44 based on the remote operating signals.

Operation

Next, explanation follows regarding operation of the present exemplary embodiment.

Display Processing

Figure 7:
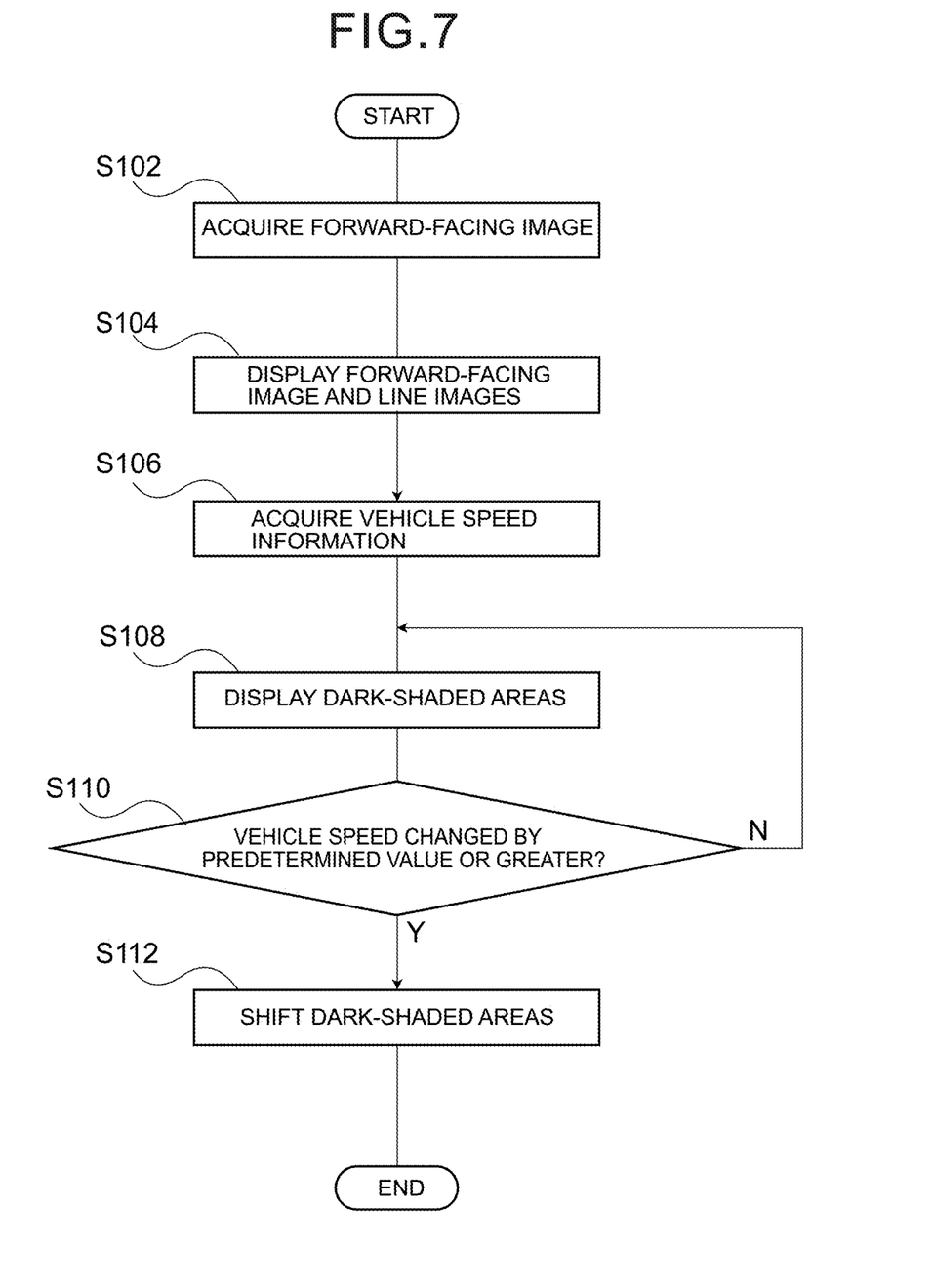
FIG. 7 is a flowchart illustrating an example of a flow of display processing.

Explanation follows regarding an example of the display processing performed by the vehicular display device 22, with reference to the flowchart illustrated in FIG. 7. The display processing is executed by the CPU 52 reading a display program from the ROM 54 or the storage 58, and expanding and executing the program in the RAM 56.

At step S102, the CPU 52 acquires forward-facing image information for the vehicle 12. Specifically, the CPU 52 uses the functionality of the forward-facing image acquisition section 74 to acquire forward-facing image information for the vehicle 12 as captured by the forward-facing camera 38.

At step S104, the CPU 52 displays the vehicle forward-facing image and the line images on the display 64. Specifically, the CPU 52 uses the functionality of the forward-facing image display section 76 to display the image captured by the forward-facing camera 38 on the display 64. The CPU 52 also uses the functionality of the line image display section 77 to display the line images RL, LL on the display 64.

At step S106, the CPU 52 acquires the vehicle speed information. Specifically, the CPU 52 uses the functionality of the vehicle speed information acquisition section 70 to acquire the vehicle speed information detected by the vehicle speed sensor.

At step S108, the CPU 52 displays the dark-shaded areas on the display 64. Specifically, the CPU 52 uses the functionality of the emphasized display section 78 to display the dark-shaded area RE superimposed on the line image RL at a position corresponding to the vehicle speed. Similarly, the CPU 52 displays the dark-shaded area LE superimposed on the line image LL at a position corresponding to the vehicle speed.

At step S110, the CPU 52 determines whether or not the vehicle speed has changed by a predetermined value or greater. Specifically, vehicle speed information regarding the vehicle 12 is acquired by the vehicle speed information acquisition section 70 at predetermined intervals, and in cases in which the vehicle speed has changed by the predetermined value or greater, the CPU 52 makes an affirmative determination at step S110 and transitions to the processing of step S112. On the other hand, in cases in which the vehicle speed has not changed by the predetermined value or greater at step S110, the CPU 52 returns to the processing of step S108 and displays the dark-shaded areas RE, LE at the same positions. Namely, the positions of the dark-shaded areas RE, LE are not shifted in cases in which the vehicle speed has not changed by the predetermined value or greater.

At step S112, the CPU 52 shifts the positions of the dark-shaded areas RE, LE. Specifically, the CPU 52 uses the functionality of the emphasized display section 78 to shift the dark-shaded areas RE, LE further toward the leading end sides of the line images RL, LL as the vehicle speed increases. The CPU 52 then ends the display processing.

As described above, in the vehicular display device 22 according to the present exemplary embodiment, the line images RL, LL are displayed extending toward the vehicle front side from the vicinity of the vehicle so as to appear in front of the vehicle 12 as illustrated in FIG. 5 and FIG. 6. Emphasized display of the vehicle sides of the line images RL, LL is performed in cases in which the vehicle speed is slow. Emphasized display is performed further toward the leading end sides of the line images RL, LL as the vehicle speed of the vehicle 12 increases. Thus, when the line images RL, LL are displayed so as to appear in front of the vehicle, the gaze of the driver viewing the line images RL, LL can be guided further toward the leading end sides of the line images RL, LL for which emphasized display is being performed as the vehicle speed increases.

Moreover, in the present exemplary embodiment, the display 64 displays the vehicle forward-facing image and displays the line images RL, LL superimposed on this image, thereby enabling the gaze of the driver viewing this image to be directed toward a suitable position according to the vehicle speed. Namely, a driver located outside the vehicle 12 can be intuitively made aware of the travel speed of the vehicle 12.

In particular, in the present exemplary embodiment, the dark-shaded areas RE, LE are shifted toward the leading end sides of the line images RL, LL when the speed of the vehicle 12 increases. Since the gaze is generally drawn to darker colors than to lighter colors, the gaze of the driver can be guided in a suitable direction by this visual effect.

Note that although the present exemplary embodiment is configured such that the dark-shaded areas RE, LE are displayed by the emphasized display section 78 so as to be overlaid on the line images RL, LL, there is no limitation thereto. For example, the configuration of a first modified example illustrated in FIG. 8 and FIG. 9, or the configuration of a second modified example illustrated in FIG. 10 and FIG. 11, may be adopted.

First Modified Example

Figure 8:
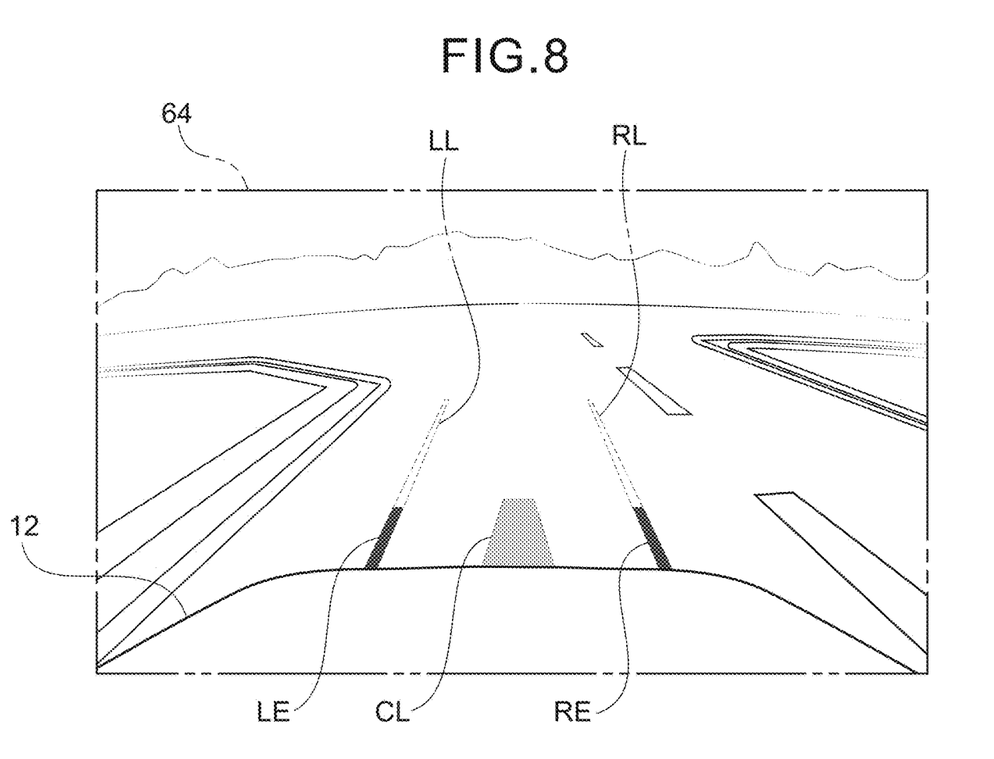
FIG. 8 is a diagram illustrating a display example on a display in a first modified example in a state in which a travel speed is low.

As illustrated in FIG. 8, in the first modified example, the line images RL, LL are either displayed as transparent or a light color that is barely visible. The emphasized display section 78 displays emphatic color areas RE, LE at the base end sides of the line images RL, LL. The emphatic color areas RE, LE are depicted in a different color than the line images RL, LL. In the present modified example, the emphatic color areas RE, LE are depicted in a contrasting color that contrasts the color of the line images RL, LL. In cases in which the line images RL, LL are displayed as transparent, the emphasized display section 78 may display the emphatic color areas RE, LE in a color with a high color saturation.

Figure 9:
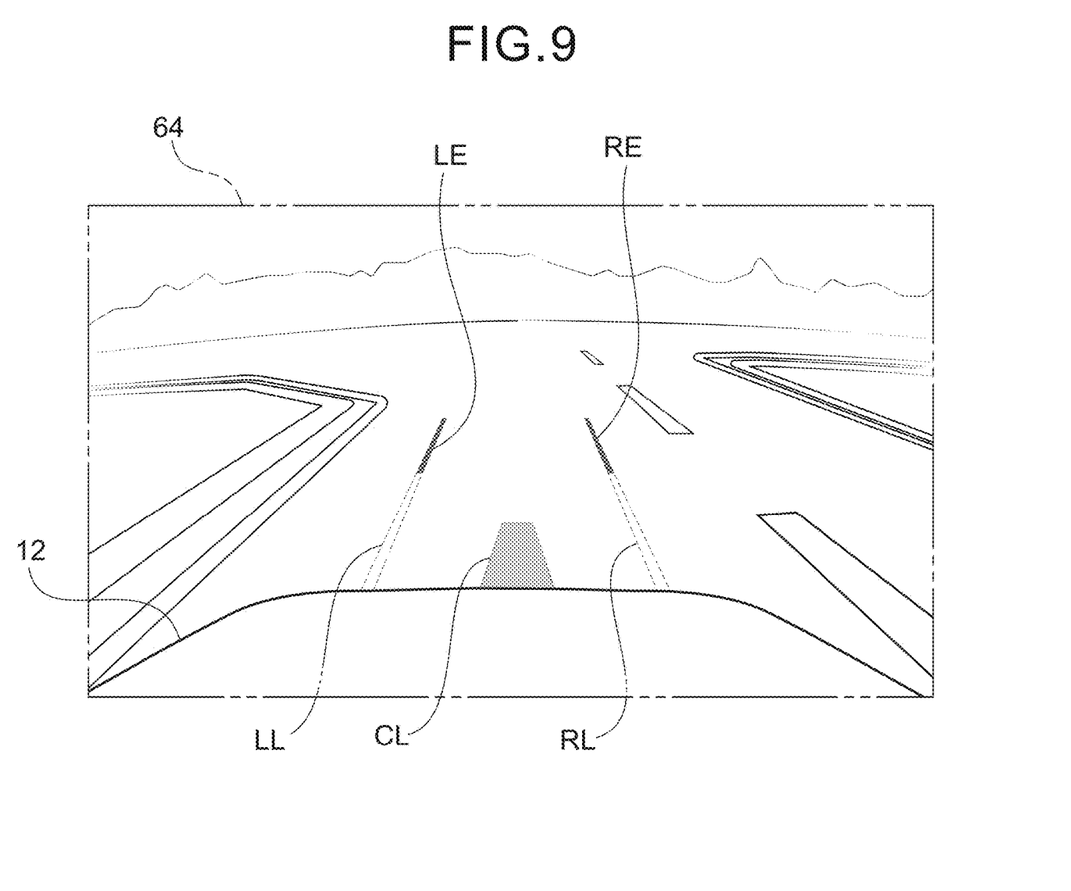
FIG. 9 is a diagram illustrating a display example on a display in the first modified example in a state in which a travel speed is high.

As illustrated in FIG. 9, the emphasized display section 78 displays the emphatic color further toward the leading end sides than the base end sides of the line images RL, LL when the vehicle speed increases. Namely, the emphatic color areas RE, LE are shifted toward the leading end sides of the line images RL, LL by the emphasized display section 78. In cases in which the line images RL, LL are displayed as transparent, the emphatic color areas RE, LE are displayed so as to move away from the vehicle 12 from the perspective of the driver.

As described above, in the present modified example, the emphatic color areas RE, LE shift toward the leading end sides of the line images RL, LL when the speed of the vehicle 12 increases. Since the gaze is generally drawn to emphatic colors, the gaze of the driver can be guided in a suitable direction by this visual effect.

Second Modified Example

Figure 10:
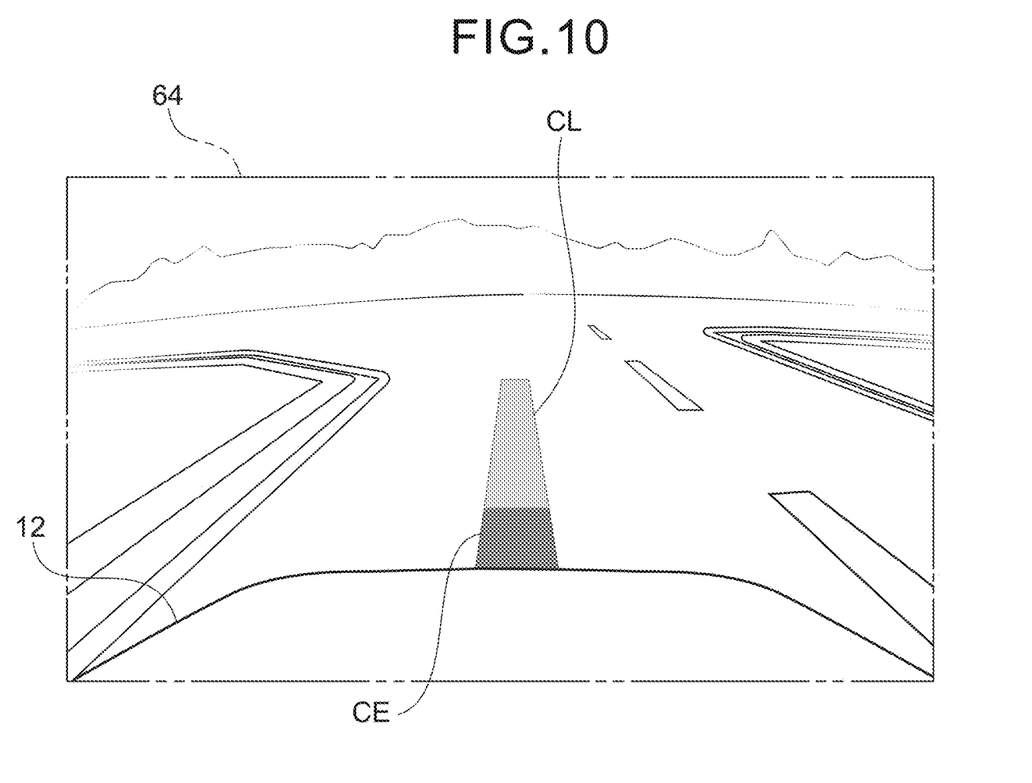
FIG. 10 is a diagram illustrating a display example on a display in a second modified example in a state in which a travel speed is low.

As illustrated in FIG. 10, in the second modified example, the line images RL, LL are not displayed, and only the line image CL is displayed by the line image display section 77. Moreover, a dark-shaded area CE for which emphasized display is performed by the emphasized display section 78 is displayed at a base end side of the line image CL (in the vicinity of the vehicle 12).

Figure 11:
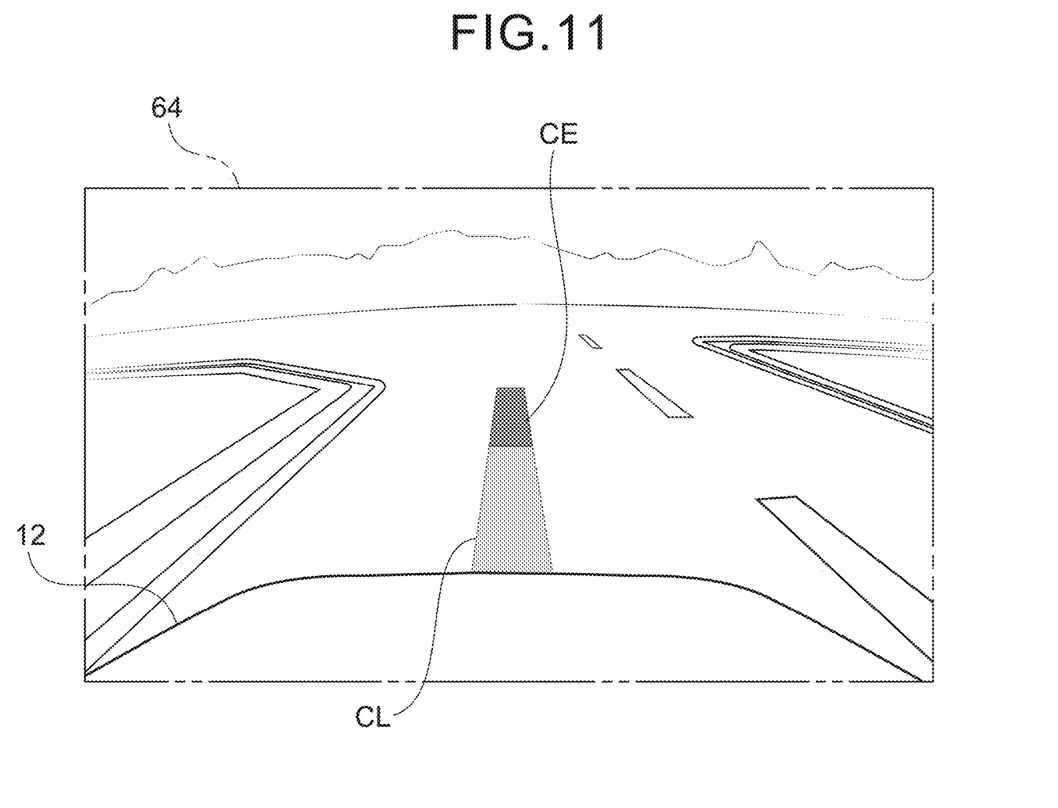
FIG. 11 is a diagram illustrating a display example on a display in the second modified example in a state in which a travel speed is high.

As illustrated in FIG. 11, the emphasized display section 78 displays the dark-shaded area CE toward the leading end side of the line image CL when the vehicle speed increases.

As described above, in the present modified example, only the single line image CL is displayed, thereby enabling the display surface area of the line image to be reduced compared to the other examples.

Second Exemplary Embodiment

Next, explanation follows regarding a vehicular display system 90 according to a second exemplary embodiment, with reference to the drawings. Note that similar configuration elements to those in the first exemplary embodiment are allocated the same reference numerals, and explanation thereof is omitted as appropriate.

Figure 12:
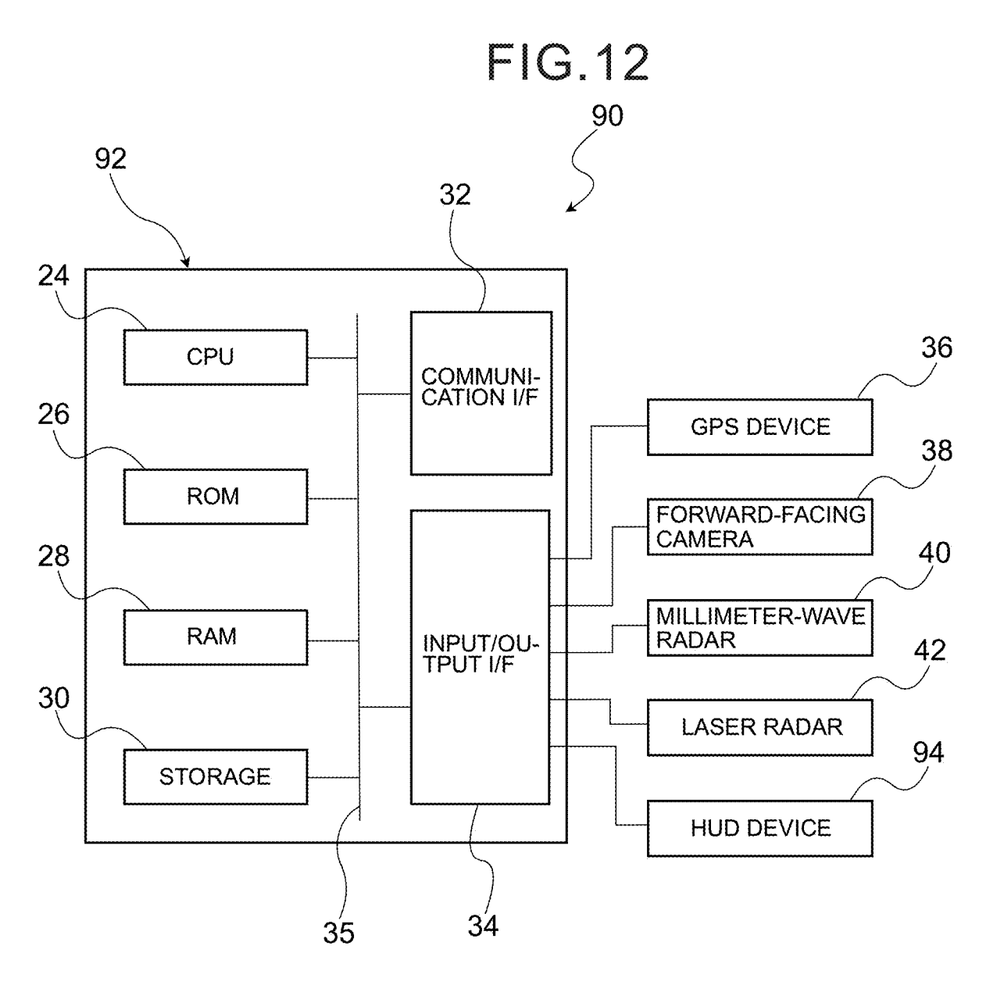
FIG. 12 is a block diagram illustrating a hardware configuration of a vehicular display system according to a second exemplary embodiment.

The vehicular display system 90 of the present exemplary embodiment includes a vehicular display device 92 instead of the travel control section 20. Note that the vehicular display device of the present exemplary embodiment differs from that in the first exemplary embodiment in that it does not include a remote operating mode (remote driving mode), and that it is installed in the vehicle.

Similarly to the travel control section 20 (see FIG. 2), the vehicular display device 92 is configured including the CPU 24, the ROM 26, the RAM 28, the storage 30, the communication interface 32, and the input/output interface 34. The GPS device 36, the forward-facing camera 38, the millimeter-wave radar 40, the laser radar 42, and a Head-Up Display (HUD) device 94 are connected to the input/output interface 34.

The HUD device 94 is for example disposed further toward the vehicle front side than a non-illustrated instrument panel, and is configured so as to project a predetermined image onto a windshield glass. Thus, the image displayed by the HUD device 94 is displayed overlaid on the scene ahead as seen through the windshield glass.

Although functional configuration of the vehicular display device 92 is as illustrated in FIG. 4 similarly to in the first exemplary embodiment, the functionality of the forward-facing image acquisition section 74, the forward-facing image display section 76, and the remote operation control section 80 may be omitted. The HUD device 94 of the present exemplary embodiment uses the functionality of the line image display section 77 and the emphasized display section 78 to display the line images and the dark-shaded areas on the windshield glass. Thus, in the present exemplary embodiment, the line images and the dark-shaded areas are displayed superimposed on the scene ahead of the vehicle as seen by the occupant.

As described above, the present exemplary embodiment enables the gaze of the occupant to be guided in a suitable direction according to the travel speed of the vehicle. Moreover, the structure can be simplified compared to cases in which application is made to a vehicle including a remote operating mode.

Note that although the image is projected on the windshield glass using the HUD device 94 in the present exemplary embodiment, there is no limitation thereto, and the image may be displayed on another display inside the vehicle cabin. For example, the scene ahead of the vehicle may be displayed on a meter display panel or a center display, and the line images and dark-shaded areas may be displayed superimposed on this scene ahead.

Although the vehicular display system 10 and the vehicular display device 22 according to the first exemplary embodiment and the second exemplary embodiment have been described above, obviously various modifications may be implemented within a range not departing from the spirit of the present disclosure. For example, although the line image display section 77 displays both the line image RL and the line image LL with a predetermined length regardless of the speed of the vehicle 12 in the above exemplary embodiments, there is no limitation thereto. Namely, the respective lengths of the line image RL and the line image LL may be changed according to the speed of the vehicle 12. As an example, the respective lengths of the line image RL and the line image LL may be displayed so as to become longer as the speed of the vehicle 12 increases. Moreover, the respective lengths of the line image RL and the line image LL may be displayed so as to become shorter as the speed of the vehicle 12 decreases, such that the displays of the line image RL and the line image LL disappear in a state in which the vehicle speed is zero.

Moreover, although the line image display section 77 displays the line images as substantially straight lines regardless of the behavior of the vehicle 12 in the above exemplary embodiments, there is no limitation thereto. For example, a line image display section may be configured to cause the line images to curve along a trajectory corresponding to the steering angle of the vehicle 12. In such cases, the driver can easily predict the direction of progress of the vehicle 12 by viewing the line images.

Furthermore, the emphasized display section 78 may perform emphasized display such that the line images become thicker further toward their leading end sides as the vehicle speed increases. In such cases, the thicker areas of the line images shift toward the leading end sides when the vehicle speed increases, such that the gaze of the driver can be guided in a suitable direction by this visual effect.

What is claimed is:

1. A vehicular display device comprising a processor, wherein the processor is configured to:
   acquire vehicle speed information regarding a speed of a vehicle; and
   display a line image extending toward a vehicle front side of the vehicle by displaying the line image in a predetermined display region so as to appear in front of the vehicle, the line image having a base end and a leading end, the base end being displayed to appear closer to the vehicle than the leading end such that the leading end appears to be farther in front of the vehicle than is the base end, the processor being configured to perform emphasized display of the line image further toward a leading end side of the line image than at a base end side of the line image as the vehicle speed increases.

2. The vehicular display device of claim 1, wherein the processor is configured to:
   acquire image information regarding a captured image of an area in front of the vehicle; and
   display the line image superimposed on the image of the area in front of the vehicle.

3. The vehicular display device of claim 1, wherein the processor is configured to display the line image superimposed on a scene ahead of the vehicle as seen by an occupant of the vehicle, by projecting the line image onto a windshield glass of the vehicle.

4. The vehicular display device of claim 1, wherein the processor is configured to perform display such that a length of the line image becomes longer as the vehicle speed increases.

5. The vehicular display device of claim 4, wherein the processor is configured to:
   display a pair of line images at positions corresponding to both width direction sides of the vehicle; and
   cause the line images to curve along a trajectory corresponding to a steering angle of the vehicle.

6. The vehicular display device of claim 1, wherein the processor is configured to perform the emphasized display such that the line image becomes a darker shade further toward the leading end side than at the base end side as the vehicle speed increases.

7. The vehicular display device of claim 1, wherein the processor is configured to perform the emphasized display by displaying the line image with a color saturation that is higher further toward the leading end side than at the base end side as the vehicle speed increases.

8. The vehicular display device of claim 1, wherein the processor is configured to perform the emphasized display such that the line image becomes thicker further toward the leading end side than at the base end side as the vehicle speed increases.

9. The vehicular display device of claim 1, wherein the processor is configured to display the line image as transparent.

10. A vehicular display system comprising:
the vehicular display device of claim 1; and
a display provided inside a vehicle cabin or outside the vehicle cabin and configured to display an image of an area in front of the vehicle and the line image.

11. A vehicular display method comprising:
acquiring vehicle speed information regarding a speed of a vehicle; and
displaying a straight line-shaped mark extending in a direction of progress of the vehicle in front of the vehicle in a predetermined display region, the line-shaped mark having a base end and a leading end, the base end being displayed to appear closer to the vehicle than the leading end such that the leading end appears to be farther in front of the vehicle than is the base end, and performing emphasized display of the mark further toward a leading end side of the mark than at a base end side of the mark as the vehicle speed increases.

12. A non-transitory storage medium storing a program executable by a computer to perform processing comprising:
acquiring vehicle speed information regarding a speed of a vehicle; and
displaying a straight line-shaped mark extending in a direction of progress of the vehicle in front of the vehicle in a predetermined display region, the line-shaped mark having a base end and a leading end, the base end being displayed to appear closer to the vehicle than the leading end such that the leading end appears to be farther in front of the vehicle than is the base end, and performing emphasized display of the mark further toward a leading end side of the mark than at a base end side of the mark as the vehicle speed increases.

* * * * *